US010943023B2

(12) United States Patent
Zhou et al.

(10) Patent No.: US 10,943,023 B2
(45) Date of Patent: Mar. 9, 2021

(54) METHOD FOR FILTERING DOCUMENTS AND ELECTRONIC DEVICE

(71) Applicant: EMC IP Holding Company LLC, Hopkinton, MA (US)

(72) Inventors: Zed Minhong Zhou, Shanghai (CN); Wei William Zhou, Shanghai (CN); Dingmeng Xue, Shanghai (CN); Jason Muhua Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 377 days.

(21) Appl. No.: 15/623,542

(22) Filed: Jun. 15, 2017

(65) Prior Publication Data

US 2017/0364696 A1 Dec. 21, 2017

(30) Foreign Application Priority Data

Jun. 16, 2016 (CN) .......................... 201610431737.8

(51) Int. Cl.
*G06F 21/62* (2013.01)
*G06F 16/23* (2019.01)
*G06F 16/93* (2019.01)

(52) U.S. Cl.
CPC ...... *G06F 21/6218* (2013.01); *G06F 16/2308* (2019.01); *G06F 16/93* (2019.01); *G06F 2221/2141* (2013.01)

(58) Field of Classification Search
CPC .......................... G06F 21/6218; G06F 16/2308
See application file for complete search history.

(56) References Cited

U.S. PATENT DOCUMENTS

| 5,940,841 | A  | * | 8/1999  | Schmuck | ............ G06F 11/1435 |
| 7,225,207 | B1 | * | 5/2007  | Ohazama | ................ G06F 16/29 |
| 7,225,263 | B1 | * | 5/2007  | Clymer  | ................ H04L 63/101 |
|           |    |   |         |         | 709/217 |
| 7,627,569 | B2 | * | 12/2009 | Gafter  | ................ G06F 21/6209 |

(Continued)

FOREIGN PATENT DOCUMENTS

| CN | 1674531 | 9/2005 |
| CN | 1836195 | 9/2006 |

(Continued)

OTHER PUBLICATIONS

Younis—A Novel Evaluation Criteria to Cloud Based Access Control Models, 2015, 11th, International Conference on Innovations in Information Technology, pp. 68-73, IEEE 2015 (Year: 2015).*

*Primary Examiner* — Luu T Pham
*Assistant Examiner* — James J Wilcox
(74) *Attorney, Agent, or Firm* — BainwoodHuang

(57) ABSTRACT

Embodiments of the present disclosure relate to a method and apparatus for document retrieval. The method comprises: determining, in response to receiving a request to retrieve a document from a user, information for the user; obtaining, based on the determined information, ACL information for the user from an ACL index, the ACL index indicating access right of at least one user to the document; and determining, based on the ACL information of the user, a document to be provided to the user from retrieved documents in response to the request. According to the embodiments of the present disclosure, the retrieval efficiency may be enhanced.

10 Claims, 6 Drawing Sheets

(56) References Cited

U.S. PATENT DOCUMENTS

| | | | | |
|---|---|---|---|---|
| 7,818,325 B1* | 10/2010 | Ohazama | | G06F 16/29 |
| | | | | 707/743 |
| 8,424,102 B1* | 4/2013 | Herbach | | G06F 21/60 |
| | | | | 726/27 |
| 9,071,623 B2* | 6/2015 | Arthursson | | G06F 9/45504 |
| 9,516,028 B1* | 12/2016 | Andruschuk | | H04L 63/101 |
| 9,626,527 B2* | 4/2017 | Ali | | H04L 9/0861 |
| 9,639,570 B2* | 5/2017 | Wright | | G06F 40/183 |
| 2002/0073235 A1* | 6/2002 | Chen | | H04L 29/06 |
| | | | | 709/246 |
| 2003/0200443 A1* | 10/2003 | Chen | | G06F 21/6218 |
| | | | | 713/182 |
| 2003/0200467 A1* | 10/2003 | Choy | | G06F 21/6218 |
| | | | | 726/4 |
| 2004/0148434 A1* | 7/2004 | Matsubara | | H04L 67/104 |
| | | | | 709/246 |
| 2006/0037068 A1* | 2/2006 | Hollberg | | G06F 21/6218 |
| | | | | 726/7 |
| 2006/0253420 A1 | 11/2006 | Hinton et al. | | |
| 2007/0214499 A1* | 9/2007 | Clymer | | H04L 63/101 |
| | | | | 726/4 |
| 2008/0162948 A1* | 7/2008 | Choi | | H04L 63/0428 |
| | | | | 713/193 |
| 2010/0115580 A1* | 5/2010 | Zurko | | H04L 63/101 |
| | | | | 726/1 |
| 2010/0250519 A1* | 9/2010 | Fiebig | | G06F 21/6227 |
| | | | | 707/718 |
| 2011/0093803 A1* | 4/2011 | Ohazama | | G06F 16/29 |
| | | | | 715/764 |
| 2011/0218999 A1* | 9/2011 | Kan | | G06F 16/217 |
| | | | | 707/737 |
| 2013/0041871 A1* | 2/2013 | Das | | H04L 63/10 |
| | | | | 707/662 |
| 2013/0042008 A1* | 2/2013 | Das | | H04L 63/10 |
| | | | | 709/226 |
| 2013/0054537 A1* | 2/2013 | Das | | H04L 63/10 |
| | | | | 707/662 |
| 2013/0054814 A1* | 2/2013 | Das | | H04L 63/10 |
| | | | | 709/226 |
| 2013/0205368 A1* | 8/2013 | Zurko | | H04L 63/101 |
| | | | | 726/1 |
| 2013/0239230 A1* | 9/2013 | Herbach | | G06F 21/60 |
| | | | | 726/28 |
| 2013/0246470 A1* | 9/2013 | Price | | G06F 21/6209 |
| | | | | 707/783 |
| 2013/0291066 A1* | 10/2013 | Okita | | H04L 63/10 |
| | | | | 726/4 |
| 2013/0312105 A1* | 11/2013 | Agrawal | | G06F 21/6218 |
| | | | | 726/26 |
| 2013/0312107 A1* | 11/2013 | Agrawal | | G06F 21/6218 |
| | | | | 726/26 |
| 2014/0033329 A1* | 1/2014 | Ohazama | | G06F 16/29 |
| | | | | 726/28 |
| 2014/0059036 A1* | 2/2014 | Das | | H04L 63/10 |
| | | | | 707/711 |
| 2014/0130180 A1* | 5/2014 | Balasubramanyan | | |
| | | | | G06F 21/604 |
| | | | | 726/27 |
| 2014/0297521 A1* | 10/2014 | Das | | H04L 63/10 |
| | | | | 705/39 |
| 2014/0344900 A1* | 11/2014 | Das | | H04L 63/10 |
| | | | | 726/4 |
| 2014/0379915 A1* | 12/2014 | Yang | | H04L 63/101 |
| | | | | 709/225 |
| 2015/0046972 A1* | 2/2015 | Zurko | | H04L 63/101 |
| | | | | 726/1 |
| 2015/0161412 A1* | 6/2015 | Price | | G06F 16/13 |
| | | | | 707/609 |
| 2015/0180894 A1* | 6/2015 | Sadovsky | | H04L 67/22 |
| | | | | 726/22 |
| 2015/0220585 A1* | 8/2015 | Das | | H04L 63/10 |
| | | | | 707/741 |
| 2015/0248277 A1* | 9/2015 | Sabbouh | | G06F 16/81 |
| | | | | 717/104 |
| 2015/0269005 A1* | 9/2015 | Das | | H04L 63/10 |
| | | | | 718/105 |
| 2015/0278543 A1* | 10/2015 | Zhang | | G06F 16/13 |
| | | | | 707/784 |
| 2015/0281243 A1* | 10/2015 | Das | | H04L 63/10 |
| | | | | 726/4 |
| 2015/0363483 A1* | 12/2015 | Behnen | | G06F 16/31 |
| | | | | 707/741 |
| 2016/0078248 A1* | 3/2016 | Price | | G06F 21/6209 |
| | | | | 707/785 |
| 2016/0080406 A1* | 3/2016 | Sadovsky | | H04L 63/1425 |
| | | | | 726/23 |
| 2016/0149913 A1* | 5/2016 | Eriksson | | H04L 63/0876 |
| | | | | 726/6 |
| 2016/0164873 A1* | 6/2016 | Das | | H04L 63/10 |
| | | | | 707/784 |
| 2016/0255093 A1* | 9/2016 | Sabbouh | | G06F 16/81 |
| | | | | 726/6 |
| 2016/0330286 A1* | 11/2016 | Keith | | H04L 67/28 |
| 2017/0250988 A1* | 8/2017 | Cantrill | | H04L 63/101 |
| 2018/0027006 A1* | 1/2018 | Zimmermann | | G06F 9/46 |
| | | | | 726/11 |

FOREIGN PATENT DOCUMENTS

| | | |
|---|---|---|
| CN | 1996955 | 7/2007 |
| CN | 101326517 | 12/2008 |
| CN | 101847155 | 9/2010 |
| CN | 101847197 | 9/2010 |
| CN | 103365852 | 10/2013 |
| CN | 103597474 | 2/2014 |
| CN | 104717290 | 6/2015 |

* cited by examiner

| USER INFORMATION | ACESS RIGHTS |
|---|---|
| USER 1 | $ACL_2$, $ACL_4$ |
| USER 2 | $ACL_1$ |
| USER 3 | $ACL_6$, $ACL_8$, $ACL_9$ |
| ... | ... |
| USER N | $ACL_2$, $ACL_4$ |

METHOD FOR FILTERING DOCUMENTS AND ELECTRONIC DEVICE

RELATED APPLICATIONS

This application claim priority from Chinese Patent Application Number CN201610431737.8, filed on Jun. 16, 2016 at the State Intellectual Property Office, China, titled "METHOD FOR FILTERING DOCUMENTS AND ELECTRONIC DEVICE" the contents of which is herein incorporated by reference in its entirety.

FIELD

Embodiments of the present disclosure relate to the field of data search, and more specifically relate to a method and device for document retrieval.

BACKGROUND

An intra-enterprise electronic document system contains numerous documents, some of which contain sensitive information and are accessible only to users with access rights. Generally, a specific document is accessed by a specific user or user group to who a corresponding access right is granted by providing security filtering. A commonly-used security filter model is a ACL (Access Control List)-based secure filtering model.

A user usually obtains a desired document by retrieving. A document system based on ACL security filtering renders a user-accessible document as a retrieved result to the user by applying a security restraint to the retrieved result. However, an ACL security filtering-based document system still has some drawbacks, e.g., slow retrieval efficiency, long user waiting time, etc.

SUMMARY

Generally, exemplary embodiments of the present disclosure provide a method for document retrieval and an apparatus using the method.

According to a first aspect, there is provided a method for document retrieval, comprising: determining, in response to receiving a request to retrieve a document from a user, information for the user; obtaining, based on the determined information, ACL information for the user from an ACL index, the ACL index indicating access right of at least one user to the document; and determining, based on the ACL information of the user, a document to be provided to the user from retrieved documents in response to the request.

In some embodiments, the ACL information indicates user accessible documents, and the determining a document to be provided to the user comprises: comparing the ACL of the retrieved documents with the ACL information for the user; and providing, in response to the ACL of a first document of the retrieved documents being included in the ACL information, the first document to the user.

In some embodiments, the ACL information indicates user inaccessible documents, and the determining a document to be provided to the user comprises: comparing the ACL of the retrieved documents with the ACL information for the user, and providing, in response to the ACL of a second document in the retrieved documents being not included in the ACL information, the second document to the user.

In some embodiments, the request to retrieve a document is received at a first machine, and the ACL index is maintained at a second machine that is different from the first machine.

In some embodiments, obtaining the ACL information for the user comprises: receiving, at the first machine, the ACL index from the second machine; querying, at the first device, the ACL index to obtain the ACL information for the user.

In some embodiments, the method further comprises: storing the ACL index received from the second machine in a volatile memory of the first machine.

In some embodiments, obtaining the ACL information for the user comprises: transmitting the information of the user from the first machine to the second machine so as to query the ACL index using the information at the second machine; and receiving, from the second machine, the ACL information for the user obtained by querying the ACL index.

According to a second aspect, there is provided an electronic device, comprising: a processing unit, a memory coupled to the processing unit and having instructions stored, the instructions, when being executed by the processor, cause the electronic device to perform actions, the actions including: determining, in response to receiving a request for to retrieve a document from a user, information for the user; obtaining, based on the determined information, ACL information for the user from an ACL (access control list) index, the ACL index indicating access right of at least one user to the document; and determining, based on the ACL information of the user, a document to be provided to the user from retrieved documents in response to the request.

According to a third aspect, there is provided a computer program product, the computer program product being tangibly stored on a non-transient computer readable medium and including machine executable instructions which, when being executed, cause the machine to execute steps of any method in the above methods.

It may be understood that this portion is not intended to identify key or important features of the embodiments of the present disclosure, not intended to limit the scope of the present disclosure. Other features of the present disclosure will become easily understood through the depictions below.

BRIEF DESCRIPTION OF THE DRAWINGS

The above and other advantages, features and objects of the present disclosure will become more apparent by the more detailed description of some embodiments of the present disclosure in the accompanying drawings, in which:

FIG. 3 is an example of an ACL index according to an embodiment of the present disclosure;

In the drawings, like or similar reference numerals represent like or similar elements.

DETAILED DESCRIPTION OF EMBODIMENTS

Hereinafter, the principle of the present disclosure will be described with reference to the accompanying drawings. It may be understood that these embodiments are only for illustration and intended to facilitate those skilled in the art to understand and implement the objectives of the present disclosure, not intended to suggest any limitation to the scope of the present disclosure. The contents disclosed here may be implemented in various manners than what have been described infra.

As described herein, terms"comprise," "include" and their variations should be understood as open-end terms, which mean "comprising/including but not limited to." The term "based on" refers to "at least partially based on." The term "one embodiment" refers to "at least one embodiment"; the term "another embodiment" refers to "at least one another embodiment."

Figure 1:
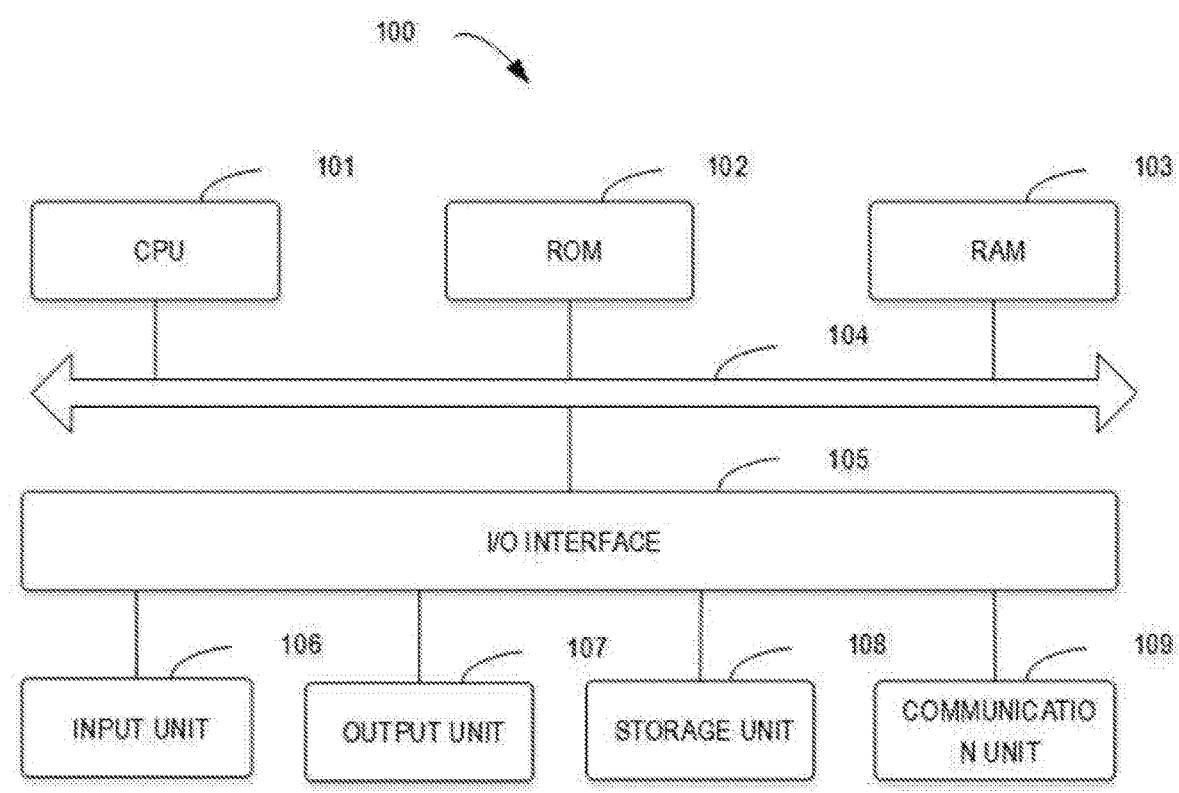
FIG. 1 is a simplified block diagram of an electronic device in which embodiments may be implemented.

FIG. 1 illustrates a simplified block diagram of an electronic device in which the embodiments of the present disclosure may be implemented. As shown in the figure, the device 100 comprises a central processing unit (CPU) 101. The CPU 101 may execute various appropriate actions and processing in accordance with the computer program instructions stored in a read-only memory (ROM) 102 or computer program instructions loaded from the memory unit 108 to the random access memory (RAM) 103. Various programs and data needed by the operations may also be stored in RAM 103. The CPU 101, ROM 102, and RAM 103 are interconnected via bus 104. The input/output (I/O) interface 105 is also connected to the bus 104.

A plurality of components in the device 100 are connected to the I/O interface 105, comprising: an input unit 106, e.g., a keyboard, a mouse, etc.; an output unit 107, for example, various types of displays, loudspeakers, etc.; a storage unit 108, e.g., a magnetic disk, an optical disk, etc.; and a communication unit 109, e.g., a network card, a modem, a radio communication transceiver, etc. The communication unit 109 allows the device 100 to exchange information/data with other device through a computer network such as Internet and/or various telecommunications network. The storage unit 108 may be the SSD, HDD, and HHD above or any currently known or future developed any other types of non-volatile storage mediums.

The device 100 for example may be a computer node of a distributed system. The device 100 may load the file management system or an application. The user may use the device 100 to retrieve documents in an enterprise document managing system or an application. In one example, the user usually inputs a keyword to retrieve a document such as using the input unit 106. The CPU 101 issues an instruction of retrieving to a local or remote database. According to the instruction, one or more documents may be retrieved.

Each document is attached with ACL information, e.g., an ACL name or other information indicating the corresponding ACL document. The corresponding ACL document may be looked up based on the ACL information. The ACL document records various kinds of access control list information, e.g., an access right set for all users or user groups. If the information of corresponding user accessible documents is recorded in the ACL file, the document may be rendered to the user as a retrieval result. If the ACL file does not record information of corresponding user accessible document or records information of corresponding user inaccessible documents, the documents will be presented to the user as retrieval results.

When the document management system has millions of or more files, and the ACL file records thousands of pieces of access rights information, such retrieval manner generally has a slow efficiency. The user possibly has to wait for seconds or even longer to obtain the retrieval results, leading to a deteriorated user experience.

Some embodiments of the present disclosure provide an improved method for document retrieval for such kinds of defects. By creating a separate ACL index and comparing the ACL information for the user in the ACL index and the ACL information attached to the document, the method may enhance retrieval efficiency and reduce the user's waiting time for document retrieval.

In the embodiments of the present disclosure, the ACL index records ACL information for individual users and may be created in a form of an optimized data structure such as HashSet or BitSet. By only comparing ACL information such as ACL name, rather than by searching the corresponding ACL file for each document and comparing each piece of information recorded in the ACL file, the amount of processing is greatly reduced when the user is searching, and the time for waiting for the search results is also correspondingly shortened.

It may be understood that an access right for the files in a system such as an enterprise document management system might be frequently changed. Therefore, the ACL index correspondingly needs to be frequently "updated." Because the full-text index actually does not support updating specific contents, the "update" of the ACL index herein actually refers to re-creating the ACL index and replacing the previous ACL index using the newly created ACL index. In order to optimize document retrieval, the embodiments of the present disclosure may be implemented in a distributed system. For example, performing document retrieval at one machine, while "updating" the ACL index at another machine. By separately implementing ACL index creation and document retrieval on different machines, consumption of computational resources of the machine where the document retrieval is located may also be reduced, thereby further reducing the amount of processing of the user in search, and correspondingly shortening the time of waiting for the retrieval result.

Figure 2:
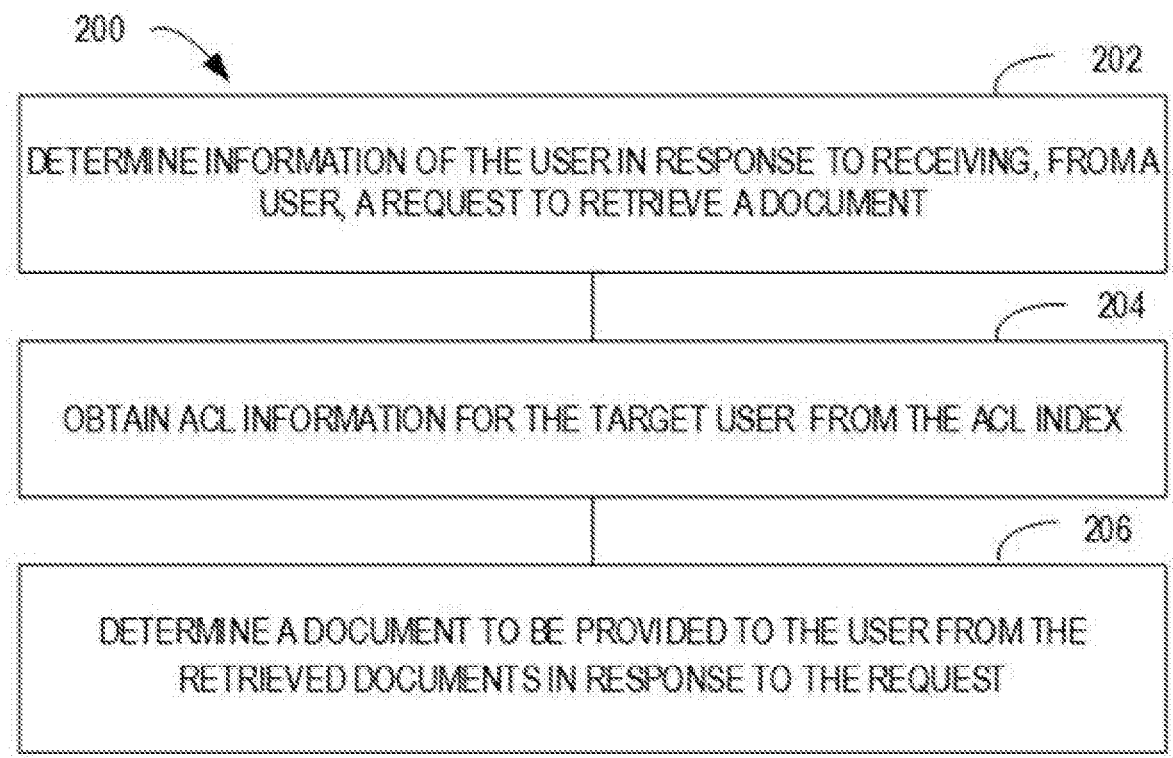
FIG. 2 is a method for document retrieval according to an embodiment of the present disclosure.

FIG. 2 shows a flow diagram of a storage management method 200 for document retrieval according to one embodiment of the present disclosure. In certain embodiments, the method 200 may be implemented, for example, by the CPU 101 in FIG. 1 which execute machine-executable instructions. The instructions here for example are stored in a memory 102 and/or 103 coupled to the CPU 101 via a bus 104. In other words, in some embodiments, the method 200 may be implemented by software. Alternatively and additionally, as described below with reference to FIG. 6, the method 200 may be implemented at least partially by hardware modules, including, but not limited to: an integrated circuit (IC) chip, an application-specific integrated circuit (ASIC) chip, and a system on chip (SoC), etc.

In step 202, in response to receiving, from a user, a request to retrieve a document, information of the user is determined. The enterprise document management system is still considered as an example. For the enterprise document management system including sensitive information, different users generally have different user names and access rights. For ease In order to facilitate the description, the enterprise document management system will be described hereinafter. However, it may be understood that the embodiments of the present disclosure are not limited to the enterprise document management system, which may also be applied to other document systems.

In step 202, an appropriate information that uniquely identifies the user may be obtained. For example, the user information may include user names specific to respective users in the system. As an instance, suppose the user uses "user 1" as a username to log onto an enterprise document management system; then the information obtained in step 202 may be username "user 1." It may be understood that for the sake of security, a logon password corresponding to the username may also exist. Therefore, in step 202, the obtained user information may also include the user's logon password or password. After the user logs onto the enterprise document management system, the user may enter a request to retrieve a document using an input unit 106 such as a keyboard or a mouse. In order to obtain access rights filtering to the retrieved documents, the enterprise document management system may determine information of the user based on information such as the logon name or logon password.

In step 204, ACL information for the target user is obtained from the ACL index. According to the embodiments of the present disclosure, the ACL index records document accessible conditions in a unit of users. In certain embodiments, the ACL index may be loaded in the volatile memory in the device 100 when the enterprise document management system is started, thereby enhancing the retrieval speed and reducing the time for the user waiting for the retrieval result. The volatile memory for example may be a device such as a memory RAM 130 or a cache. In this way, in step 204, the CPU 101 may obtain the ACL information specific to the target user by directly accessing the ACL index in the memory.

FIG. 3 is an example of an ACL index 300 according to an embodiment of the present disclosure. As shown in this example, the ACL index 300 has a "user information" column 310 and an "access rights" column 320. The column 310 records information of a user, which, in this example, is a globally unique username in the system. It should be noted that the user information obtained at step 202 should be consistent with the user information recorded in the column 310. Column 320 records the user's document access rights. In the example here, there is one or more ACL filename lists; each ACL filename list, for example, includes filename information of user accessible and/or inaccessible documents. It may be understood that other identification information may be used to identify user accessible and/or inaccessible documents.

It may be understood that the enterprise document management system generally has a plurality of users. In certain embodiments, the user may be classified. For example, some users have lower access rights, while some other users have higher access rights. It may be understood that users having lower access rights can only access less documents, while users having higher access rights may access most documents other than some documents. For users of the first class, the number of accessed documents is far less than the number of inaccessible documents. For users of the second class, the number of accessible documents is far larger than the number of inaccessible documents.

In the embodiment shown in FIG. 3, in order to reduce file size of the ACL index and the occupied space of the volatile memory, the ACL index may store different information for users of different types. For example, for users with a lower access right (referred to as "first class of users"), the ACL index specified ACL information of documents accessible thereby, e.g., ACL file names. In contrast, for users with a higher access right (referred to as "second class of users"), the ACL index may specify ACL information of inaccessible documents, e.g., ACL filename information.

In the example of FIG. 3, in order to distinguish the first class of users and the second class of users, a specific flag, e.g., "!," may be added before the second class of filenames. It may be understood that use of the flag "!" is only exemplary, not limitative, and any other appropriate manners may be used to distinguish different classes of users in the ACL index. For example, in one embodiment, a specific field or bit may be set in the ACL index to indicate the class to which the user belongs, etc.

Specifically, in this example, "user 1," "user 2" and "user 3" are first class of users. The "user 1" may access documents corresponding to $ACL_2$ and $ACL_4$. The "user2" may access documents corresponding to $ACL_1$. The "user 3" may access documents corresponding to $ACL_6$, $ACL_8$, and $ACL_9$. In contrast, the "user N" shown in FIG. 3 may be a second class of users, as an example. "The user N" (N is a natural number) may access all other documents than those corresponding to $ACL_2$ and $ACL_4$.

It should be noted that the user class-based ACL index is only exemplary. In some embodiments, the ACL index may store information of a uniform format irrespective of user classes. For example, accessible (inaccessible) document information may be stored for all users. For another example, in some other embodiments, ACL indexes of different types of users may be stored separately. In other words, there may have a plurality of different ACL index tables.

In addition, in the example shown in FIG. 3, the ACL index stores ACLs associated with respective users. These ACLs record information about accessible or inaccessible documents, e.g., filenames or identifiers of documents, etc. Alternatively, in some other embodiments, identifiers of user accessible or inaccessible documents may be directly stored. In other words, document identifiers may be directly stored in the column "list of rights".

Still referring to FIG. 2, in step 204, the ACL index 300 is retrieved using the user information determined in step 202 so as to determine ACL information corresponding to the user. The ACL information at least indicates access rights of the user. For example, suppose the user name of the current target user determined in step 202 is "user 2," the ACL information obtained in step 204 may include "ACL1."

In step 206, a document to be provided to the user is determined from the retrieved documents in response to the request based on the ACL information of the user obtained in step 204. In one embodiment, the ACL information for the user in the ACL index may be compared with the ACL information attached to the document, and based on the comparison result, it is determined whether the user has access rights to the document. The enterprise document management system then may present the user accessible document as the retrieval result to the user.

As described above, for example when user 1 is retrieving, in response to the request to retrieve a document, the document only accessible to user 1 and corresponding to $ACL_2$ and $ACL_4$ may be determined from the ACL index of FIG. 3. The enterprise document management system then compares $ACL_2$ and $ACL_4$ with ACL information attached to all retrieved documents, and provides a document having at least one of $ACL_2$ and $ACL_4$ to the user.

In another example, if the user N is retrieving, in response to the request to retrieve a document, all other documents accessible to the user N than those corresponding to $ACL_2$ and $ACL_4$ may be determined from the ACL index of FIG. 3. The enterprise document management system then compares $ACL_2$ and $ACL_4$ with the ACL information attached to all retrieved documents, and provides a document that does not have at least one of $ACL_2$ and $ACL_4$ to the user.

Figure 4:
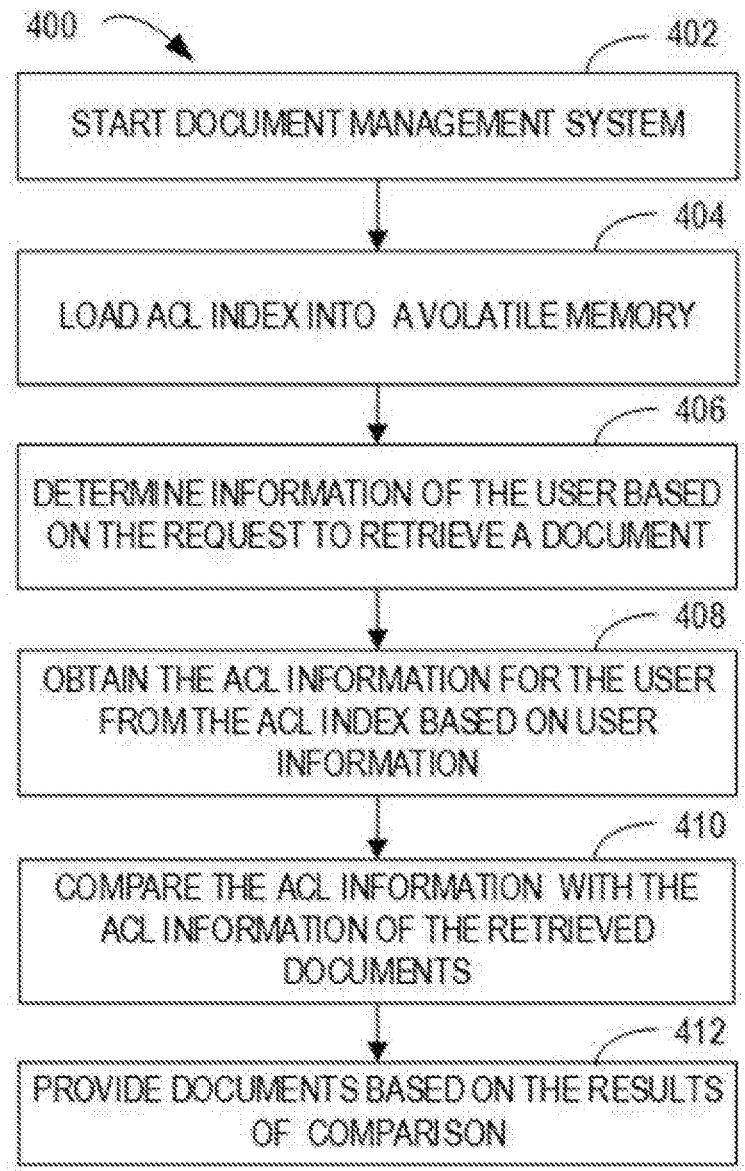
FIG. 4 is a schematic flow chart of a method for document retrieval according to an embodiment of the present disclosure.

Several examples of document access control according to the embodiments of the present disclosure have been described above with reference to FIGS. 1-3. In certain embodiments, the ACL index may be loaded into a memory of the device 100, e.g., RAM 103 and/or storage unit 108. In this way, the operation on the ACL index may be completed locally at the device 100. FIG. 4 illustrates a flow diagram of such an embodiment of method 400.

As shown in FIG. 4, in step 402, an enterprise document management system is started in the device 100. In step 404, the ACL index is loaded into a memory or a volatile memory such as a cache. The ACL index may be stored in the storage unit of the device 100. The ACL index may also be stored at another node in the distributed system. In this case, the device may receive the ACL index from another node and loads it into the volatile memory of the device 100, e.g., CPU 101 or RAM 103.

In step 406, the user performs retrieval by for example entering a keyword. The enterprise document management system determines information of the user based on the request to retrieve a document, e.g., "user 1" in FIG. 3. In step 408, based on the determined user information, the ACL information for the user is obtained from the ACL index loaded in the volatile memory of the device 100, e.g., $ACL_2$ and $ACL_4$ for "user 1."

In step 410, the ACL information for the user is compared with the ACL information of the retrieved documents. For example, the ACL information attached to the retrieved document 1 is "$ACL_1$," and the ALC information attached to document 2 is "$ACL_2$," and so on, the ACL information attached to document M is "$ACL_M$," where M is a natural number. Through comparison, it may be determined that user 1 has access rights to document 2 and document 4. In step 412, document 2 and document 4 are provided to the user.

Figure 5:
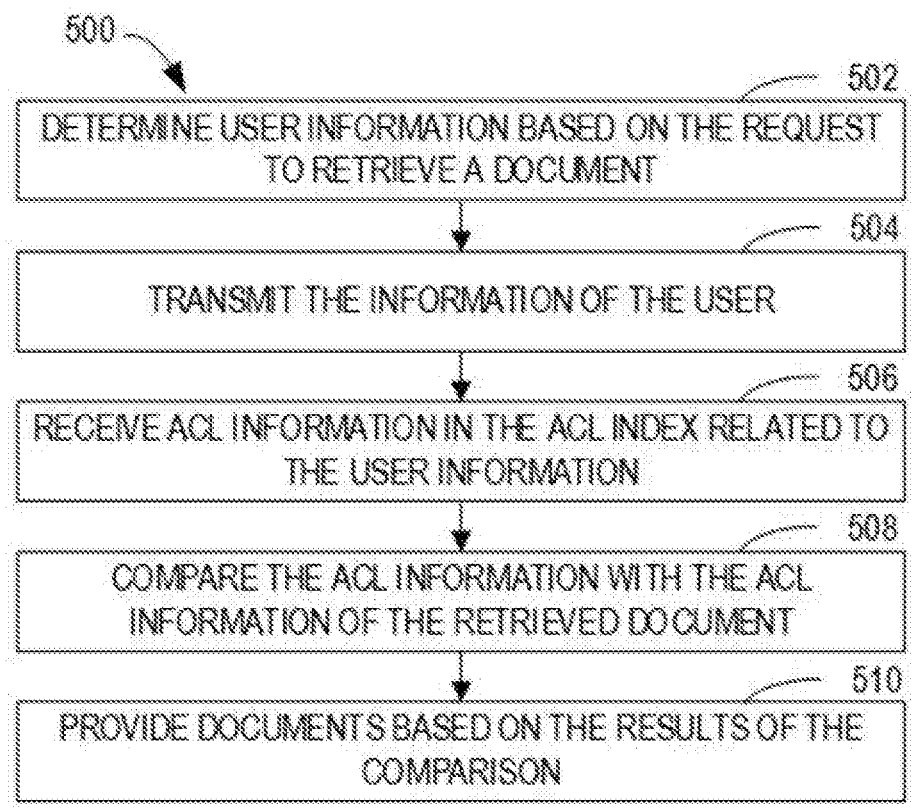
FIG. 5 is a schematic flow chart of a method for document retrieval according to another embodiment of the present disclosure.

Local processing shown in FIG. 4 facilitates efficient operation on the ACL index. Different from the local processing mode shown in FIG. 4, in some alternative embodiments, the operation on the ACL index may be completed in a distributed manner. In other words, in such an embodiment, the ACL index may be maintained remote to the device 100. FIG. 5 shows a flow diagram of a method 500 according to this embodiment.

As illustrated in FIG. 5, in step 502, the user enters a keyword to perform retrieval. The enterprise document management system determines user information based on the request to retrieve a document, e.g., "user N" in FIG. 3. In step 504, the device 100 (for ease of depiction, hereinafter referred to as "first machine") transmits the information of the user to a further device loaded with the ACL index in the distributed system (for ease of depiction, hereinafter referred to as "second machine") through a communication unit.

The second machine determines the ACL information for the user information from the ACL index based on the received user information, e.g., $ACL_2$ and $ACL_4$ for "! User N." The second machine transmits the ACL information to the first machine. In step 506, the first machine correspondingly receives ACL information related to the user information. In step 508, the first machine compares the ACL information with the ACL information of the retrieved document. For example, the ACL information attached to the retrieved document 1 is "$ACL_1$," the ACL information attached to document 2 is "$ACL_2$," and so on, and the ACL information attached to document M is "$ACL_M$," where M is a natural number. Through comparison, it may be determined that except document 2 and document 4, the user N has access rights to all other documents. In step 510, all other documents than document 2 and document 4 are provided to the user.

Compared with the embodiment shown in FIG. 4, in such distributed mode shown in FIG. 5, management and maintenance of the ACL index may be execute remotely. For example, the second device may be a device having a higher computational capacity and/or storage capacity, e.g., a server, etc. In this way, computation and/or storage load at the first device can be effectively reduced.

Figure 6:
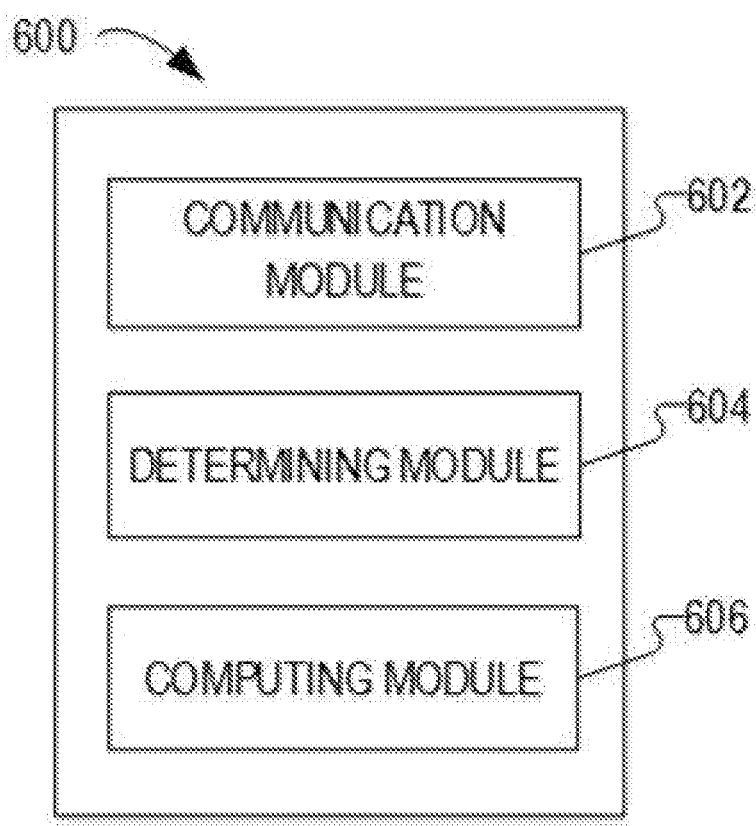
FIG. 6 is a block diagram of an apparatus for document retrieval according to an embodiment of the present disclosure.

FIG. 6 shows a schematic block diagram of an apparatus for document retrieval according to an embodiment of the present disclosure. Generally, the processing unit 600 may comprise modules configured to implement the functions and operations shown in FIGS. 2, 4 and 5. In this example, the processing 600 comprises: a communication module 602, a determining module 604, and a computational module 606. In this example, the determining module 604 is configured to determine the user's information in response to the request for document retrieval received from the user. The communication module 602 is configured to obtain ACL information for the user from a user access list (ACL) based on the determined information, the ACL index indicating access rights of at least one user to the documents. The determining module 604 is also configured to determine a document to be provided to the user from retrieved documents in response to the request based on the user's ACL information.

In some embodiments, the ACL information indicates user accessible documents. The computing module 606 is configured to compare the ACL of the searched documents with the ACL information for the user. The communication module 602 is also configured to provide, in response to the ACL of a first document of the retrieved documents being included in the ACL information, the first document to the user.

In certain embodiments, the ACL information indicates user inaccessible documents. The computing module 606 is configured to compare the ACL of the searched documents with the ACL information for the user. The communication module 602 is also configured to provide, in response to the ACL of a second document in the retrieved documents being not included in the ACL information, the second document to the user.

In certain embodiments, the request for document retrieval is received at a first machine including the processing unit 600, and the ACL index is maintained at a second machine that is different from the first machine.

In certain embodiments, the communicating module 602 is also configured to receive, at the first machine, the ACL index from the second machine. The computing module 606 is also configured to query, at the first device, the ACL index to obtain the ACL information for the user.

In certain embodiments, the first machine may also comprise a volatile memory for storing the ACL index received form the second machine.

In certain embodiments, the communication module 602 is configured to transmit the information of the user from the first machine to the second machine so as to query the ACL index using the information at the second machine; and receive, from the second machine, the ACL information for the user obtained by querying the ACL index.

In certain embodiments, part or all modules in the processing unit 600 may be implemented through software. Alternatively, the modules of the processing unit 600 may also be implemented in other manners, for example, by hardware, including, but not limited to: an integrated circuit (IC) chip, an application-specific integrated circuit (ASIC) chip, and a system on chip (SoC).

Generally, various exemplary embodiments of the present disclosure may be implemented in hardware or specific circuits, software, logic, or any combination thereof. Some aspects may be implemented in hardware, while other aspects may be implemented in firmware or software that may be executed by a controller, a microprocessor or other computing device. Although various aspects of the embodiments of the present disclosure are illustrated or described as block diagrams, flow diagrams or represented by some other diagrams, it should be understood that the blocks, apparatuses, systems, technologies or methods described herein may be implemented as non-limitative manner in hardware, software, firmware, specific circuit or logic, general hardware or controller or other computing device or some combinations thereof.

In addition, although the operations are depicted in a specific order, it should not be understood as requiring such kind of operations be complemented in a specific order as shown or in succession, or all of the illustrated operations be executed to obtain a desired result. In some cases, multi-task or parallel processing will be beneficial. Likewise, although the discussion includes some specific implementation details, it should not be interpreted as limiting the scope of the disclosure, but should be interpreted as depiction of the feature for specific embodiments. Certain features described in the some separate embodiments may be performed in a single embodiment. In turn, various features described in a single embodiment may be separately implemented in a plurality of embodiments or in any appropriate sub-combination.

Although the present disclosure is depicted with specific structural features and/or method actions, it may be understood that the present disclosure limited in the appended claims are not necessarily limited to the specific features or actions above. The specific features and actions above are only disclosed in the exemplary manner of implementing the claims.

We claim:

1. A method for document retrieval, comprising:
    determining, in response to receiving a request to retrieve a document from a user, information for the user;
    obtaining, based on the determined information, ACL (Access Control List) information for the user from an ACL index, the ACL index indicating access right of at least one user to the document, the ACL index including an entry that associates a particular user with documents that the particular user is allowed to access by specifying only documents that the particular user is denied access and providing a flag that indicates that the set of documents are denied rather than allowed; and
    determining, based on the ACL information of the user, a document to be provided to the user from retrieved documents in response to the request,
    wherein the request to retrieve a document is received at a first machine, and the ACL index is maintained at a second machine that is different from the first machine, and
    wherein obtaining the ACL information for the user comprises (i) receiving, at the first machine, the ACL index from the second machine, (ii) storing the ACL index received from the second machine in a volatile memory of the first machine, and (iii) querying, at the first machine, the ACL index to obtain the ACL information for the user,
    wherein the method further comprises dividing computational load between the first machine and the second machine when updating the ACL index by (i) performing document retrieval by the first machine and (ii) re-creating the ACL index on the second machine,
    wherein the method further comprises creating the ACL index based on an ACL file that records access rights information for a plurality of users and for at least a million documents, the ACL index storing ACL information for individual users and created as a searchable data structure separate from the ACL file, wherein querying the ACL index by the first machine distributes processing tasks between the first machine and the second machine and avoids a computational burden on the second machine, wherein the plurality of users includes a first set of users having lower access rights and a second set of users having higher access rights, and wherein the method further comprises reducing a size of the ACL index by (i) specifying ACL information for the first set of users by identifying documents allowed to be accessed and (ii) specifying ACL information for the second set of users by identifying documents not allowed to be accessed, and
    wherein the method further comprises retrieving the document, by the first machine, utilizing the ACL index.

2. The method according to claim 1, wherein the ACL information indicates user accessible documents, and the determining a document to be provided to the user comprises:
    comparing the ACL of the retrieved documents with the ACL information for the user; and
    providing, in response to the ACL of a first document of the retrieved documents being included in the ACL information, the first document to the user.

3. The method according to claim 1, wherein the ACL information indicates user inaccessible documents, and the determining a document to be provided to the user comprises:
    comparing the ACL of the retrieved documents with the ACL information for the user; and
    providing, in response to the ACL of a second document in the retrieved documents being not included in the ACL information, the second document to the user.

4. The method according to claim 1, wherein obtaining the ACL information for the user comprises:
    transmitting the information of the user from the first machine to the second machine so as to query the ACL index using the information at the second machine; and
    receiving, from the second machine, the ACL information for the user obtained by querying the ACL index.

5. The method of claim 1, wherein the ACL index includes at least one of a HashSet or a BitSet.

6. An electronic device, comprising:
    a processing unit, and
    a memory coupled to the processing unit and having instructions stored, the instructions, when being executed by the processing unit, causes the electronic device to perform actions, the actions including:
        determining, in response to receiving a request to retrieve a document from a user, information for the user;
        obtaining, based on the determined information, ACL (Access Control List) information for the user from an ACL (access control list) index, the ACL index indicating access right of at least one user to the document, the ACL index including an entry that associates a particular user with documents that the particular user is allowed to access by specifying only documents that the particular user is denied access and providing a flag that indicates that the set of documents are denied rather than allowed; and determining, based on the ACL information of the user, a document to be provided to the user from retrieved documents in response to the request, wherein the request to retrieve a document is received at a first machine, and the ACL index is maintained at a second machine that is different from the first machine, and wherein obtaining the ACL information for the user comprises (i) receiving, at the first machine, the ACL index from the second machine, (ii) storing the ACL index received from the second machine in a volatile memory of the first machine, and (iii) querying, at the first machine, the ACL index to obtain the ACL information for the user, wherein the actions further include dividing computational load between the first machine and the second machine when updating the ACL index by (i) performing document retrieval by the first machine and (ii) re-creating the ACL index on the second machine, wherein the actions further include creating the ACL index based on an ACL file that records access rights information for a plurality of users and for at least a million documents, the ACL index storing ACL information for individual users and created as a searchable data structure separate from the ACL file, wherein querying the ACL index by the first machine distributes processing tasks between the first machine and the second machine and avoids a computational burden on the second machine, wherein the plurality of users includes a first set of users having lower access rights and a second set of users having higher access rights, and wherein the actions further include reducing a size of the ACL index by (i) specifying ACL information for the first set of users by identifying documents allowed to be accessed and (ii) specifying ACL information for the second set of users by identifying documents not allowed to be accessed, and wherein the actions further include retrieving the document, by the first machine, utilizing the ACL index.

7. The electronic device according to claim 6, wherein the ACL information indicates user accessible documents, and the determining a document to be provided to the user comprises:

comparing the ACL of the retrieved documents with the ACL information for the user; and providing, in response to the ACL of a first document of the retrieved documents being included in the ACL information, the first document to the user.

8. The electronic device according to claim 6, wherein the ACL information indicates user inaccessible documents, and the determining a document to be provided to the user comprises:

comparing the ACL of the retrieved documents with the ACL information for the user; and providing, in response to the ACL of a second document in the retrieved documents being not included in the ACL information, the second document to the user.

9. The electronic device according to claim 8, wherein obtaining the ACL information for the user comprises:

transmitting the information of the user from the first machine to the second machine so as to query the ACL index using the information at the second machine; and receiving, from the second machine, the ACL information for the user obtained by querying the ACL index.

10. A computer program product, the computer program product being stored on a non-transient computer readable medium and including machine executable instructions which, when being executed, cause the machine to execute steps of determining, in response to receiving a request to retrieve a document from a user, information for the user;

obtaining, based on the determined information, ACL (Access Control List) information for the user from an ACL index, the ACL index indicating access right of at least one user to the document, the ACL index including an entry that associates a particular user with documents that the particular user is allowed to access by specifying only documents that the particular user is denied access and providing a flag that indicates that the set of documents are denied rather than allowed; and determining, based on the ACL information of the user, a document to be provided to the user from retrieved documents in response to the request, wherein the request to retrieve a document is received at a first machine, and the ACL index is maintained at a second machine that is different from the first machine, and wherein obtaining the ACL information for the user comprises (i) receiving, at the first machine, the ACL index from the second machine, (ii) storing the ACL index received from the second machine in a volatile memory of the first machine, and (iii) querying, at the first machine, the ACL index to obtain the ACL information for the user, wherein the executable instructions further cause execution of dividing computational load between the first machine and the second machine when updating the ACL index by (i) performing document retrieval by the first machine and (ii) re-creating the ACL index on the second machine, wherein the machine executable instructions further cause the machine to execute steps of creating the ACL index based on an ACL file that records access rights information for a plurality of users and for at least a million documents, the ACL index storing ACL information for individual users and created as a searchable data structure separate from the ACL file, wherein querying the ACL index by the first machine distributes processing tasks between the first machine and the second machine and avoids a computational burden on the second machine, wherein the plurality of users includes a first set of users having lower access rights and a second set of users having higher access rights, and wherein the machine executable instructions further cause the machine to execute steps of reducing a size of the ACL index by (i) specifying ACL information for the first set of users by identifying documents allowed to be accessed and (ii) specifying ACL information for the second set of users by identifying documents not allowed to be accessed, and wherein the machine executable instructions further cause the machine to retrieve the document, by the first machine, utilizing the ACL index.

* * * * *